3,531,294
PREPARATION OF A BAKING AGENT FOR USE IN YEAST-LEAVENED PRODUCTS
Charles A. Glabau, 114 E. Midland Ave.,
Paramus, N.J. 07652
No Drawing. Filed Jan. 30, 1968, Ser. No. 701,551
Int. Cl. A21d 2/04; A23c 21/00
U.S. Cl. 99—57                      10 Claims

ABSTRACT OF THE DISCLOSURE

A baking additive for use in making yeast-leavened products is prepared by heating a suspension of soy flour, liquid whey and/or liquid non-fat milk in the presence of calcium peroxide.

---

The present invention relates to an improved method of making yeast-leavened products and, more particularly, to a novel baking addition agent, to be used therein.

Heretofore, those skilled in the art know that in the practice of making bread and related leavened products, two systems have generally been employed. One is the multiple stage sponge method and the other is the continuous dough making system. It has long been known in the art that non-fat dry milk seriously affects the volume, symmetry, cellular structure, and texture of bread when used as such. Research by prior investigators has found that such non-fat milk, when heat treated by holding it at about 180° F. to about 190° F. over a period of time, overcomes this undesirable property to a certain degree when it is used in the conventional system of bread making. However, when used in the continuous system, the baker has found that he cannot go much above 2% on the weight of flour as against 6% in the conventional method. This serious short-coming, together with the high price of non-fat dry milk, has brought into use dry, heat-treated, non-fat soy flour alone or in combination with heat-treated, dry whey and, in some cases, with non-fat dry milk. While these prior products were used alone or in combination, the prior products were still not sufficiently stable, even though the baker used a somewhat increased quantity of potassium bromate and potassium iodate alone or in combination. This was especially true when he used the continuous system. The baker was limited in the quantitative use of these prior oxidizing agents to seventy parts per million per hundred weight of flour, as defined by the Food and Drug Administration "Standards of Identity for White Bread and Rolls." Although many attempts were made to overcome the foregoing shortcomings and other disadvantages, none, as far as I am aware, was entirely successful when carried into practice commercially on an industrial scale.

It has now been discovered by my research that it is possible to use calcium peroxide to overcome the undesirable baking characteristics of non-fat milk, whey, and soy flour alone or in combination.

It is an object of the present invention to provide an improved method of making yeast-leavened products.

Another object of the invention is to provide a novel addition agent for use in the making of baked goods, such as bread and rolls.

The invention also contemplates the incorporation of a novel whey-soy concentrate in yeast-leavened dough for baking into bread and rolls.

It is a further object of the invention to provide for the treatment of milk and milk derivatives in liquid form by calcium peroxide alone or in combination with hydrogen peroxide.

The invention further contemplates providing an oxidation treatment of milk and milk derivatives in liquid form by calcium peroxide in the presence of an organic acid, such as lactic acid.

It is another object of the invention to provide an oxidation treatment for defatted soy flour in water suspension in the presence of calcium peroxide by heating at a near boiling temperature for a period of time.

Among the further objects of the present invention is the provision of an oxidation treatment of whey, non-fat milk and defatted soy flour suspended in liquid by calcium peroxide in the presence of lactic acid or similar organic acid and by heating to near boiling temperature for a short period of time of less than one hour.

Other objects and advantages will become apparent from the following description.

I have found that non-fat milk, whey, and/or soy flour can be subjected to oxidation by calcium peroxide in accordance with my procedure and can produce a novel baking addition agent. It is preferred to make a slurry composed of liquid whey, soy flour (defatted), and calcium peroxide according to the following formula:

| Ingredient: | Amount, pounds |
|---|---|
| Liquid whey | 1,000 |
| Soy flour (defatted) | 70 |
| Calcium peroxide | .75–1 |

However, calcium peroxide may be used in a broad range of about 0.25 to 1.5. It is to be noted, however, that partially defatted soya flour, partially defatted milk, alone or in combination, may be used as well as non-fat milk. As those skilled in the art know, there are basically two types of whey: namely, (1) sweet whey derived from cheddar, Swiss, etc., and (2) acid whey derived from cottage cheese or other acid cheeses. When sweet whey is used, it is necessary to use lactic acid to react with the calcium peroxide and thus produce hydrogen peroxide. On the other hand, acid whey contains enough lactic acid to bring about the reaction involving calcium peroxide. The protein fraction obtained from soya flour and/or beans may also be added.

In carrying my procedure into practice, the liquid whey, soy flour, and calcium peroxide are thoroughly mixed to produce a slurry. This slurry can be fed into an appropriate apparatus, such as a conventional jacketed dairy tank well known in the art. The slurry is heated to about 180° F. for about 20 to about 30 minutes. Thereafter, the slurry is condensed down to a 25% to 30% solids content by using a dairy condensing system or other suitable method as well known by those skilled in the art. The condensed slurry is fed under agitation directly into an appropriate dryer. It is preferred to use a spray dryer, preferably of the rotating disc type. The Webb spray dry method may also be used where air, $CO_2$, or nitrogen are injected into the mass to be dried. As another alternative, a roller drying system may be used.

The whey-soy dried product produced in accordance with the foregoing procedure is preferably dried to about a 3% moisture level thereby producing a white powder-like material. Its composition, due in part to the high lactose content of the whey and the amino acid structure of both whey and soy, parallels the composition of non-fat dry milk. The novel whey-soy concentrate or addition agent has good nutritive value due to the incorporation of calcium which raises the level of this valuable element above that contained in either whey or soy.

The properties of the novel whey-soy concentrate, addition agent, baking additive or bread improver are very valuable in the baking of bread, rolls, etc., and have a high protein efficiency ratio (PER). These properties are especially important in connection with the amino acids lysine-triptophane "balance" which is not possessed by ordinary bread, rolls, etc., as such, and which thus increases the nutritive value of the novel concentrate, addition agent, baking additive or bread improver.

The novel whey-soy concentrate or addition agent in dry form may replace non-fat dry milk where such a product is not desirable in both the conventional and the continuous systems for producing yeast-leavened goods. It has been found that, when the novel concentrate, addition agent, baking additive or bread improver is used at the rate of from about 2% to about 5% on the weight of floor, good bread is produced, which is not encumbered with any of the undesirable properties when milk is used alone or when mechanical mixtures of whey, soy and/or milk are employed.

Generally speaking, the present invention contemplates the presence of an appropriate amount of lactic acid. As calcium lactate is formed during the treatment with calcium peroxide, it is present in the final dough and it is valuable in "firming" the dough through firming the micel structure of the protein. In this manner, it reduces the undesirable sheering effect brought about in the dough developer or mixer in the continuous system. Usually, this amount is about 1.25 pounds to about 2 pounds or so, which amount is required to react with the calcium peroxide as given in the example. When lactic acid is not present in sufficient amount, an additional amount is added to the slurry. Instead of lactic acid, other suitable organic acids may be used, such as malic, fumaric, citric, tartaric, mucic, and such other acids permitted in food products which fall into the category of aliphatic acids. In place of some of the lactic acid or other aliphatic food acids, phosphoric acid may be used. Such phosphoric acid would react with calcium peroxide to form calcium phosphate which in itself has nutritive value.

In the present improved method for the production of white bread and rolls, the baker may use a series of stainless steel tanks, such as those employed in the dairy industry. In carrying the present method into practice, the baker makes what is termed a "fluid sponge," often referred to as a liquid brew, which is composed of flour, yeast, so-called yeast food, salt at the rate of ¼ of 1%, and mold inhibitor at the rate of 0.125%, and the major portion of the water. The yeast food contains a combination of calcium sulphate (hydrate), ammonium chloride, sodium chloride, potassium bromate and/or potassium iodate, and flour enough to make a hundred weight (usually about 40%). These ingredients are automatically weighed into the primary tank containing an agitator, which brings about a thorough co-mingling of the mass in the form of batter or slurry. This so-called fluid sponge is fermented usually from about 120 to about 150 minutes at a temperature of about 78° F. to about 80° F. The mass is then pumped through sanitary lines directly into the dough mixer, to which is added the remainder of the flour, water, salt, sugar (sucrose or dextrose, or a combination thereof), the novel whey-soy concentrate, shortening, and an emulsifier usually composed of a variety of mono and di-glycerides and, under some conditions, the so-called bread improvers. The final dough containing the novel whey-soy concentrate is then baked in accordance with conventional practice as well known to those skilled in the art.

In the batch system, the mass is mixed under rather rapid agitation to obtain a smooth dough which in most cases is allowed to rest for about 20 to about 30 minutes before it goes to the divider. The divider divides the dough into required units of weight which then go to the rounder, the overhead "proofer" for a period of about 8 to about 10 minutes, and then to the molder which molds the dough into a cylindrical shape which is deposited into baking pans. From this point, the panned dough on racks is placed into a "proofing" cabinet where the dough is permitted to rise to the required volume, usually for about 45 minutes, and then goes to the oven for baking in the usual manner.

In the continuous system, the so-called fluid sponge is automatically piped to a blending trough to which the balance of the ingredients is automatically conveyed. This is piped into a continuous mixer from which the dough is automatically extruded and deposited into pans. From this point on, the dough is "proofed" to required volume and then goes to the oven. To elucidate the procedure, the following Table I shows a conventional type of formula with a division of ingredients in accordance with the principles of the present invention.

TABLE I

| Ingredients | Percent on flour weight, lbs. | Fluid sponge dough Percent, lbs. | Fluid sponge dough Percent, lbs. |
|---|---|---|---|
| Flour | 100 | 50 | 50 |
| Water | 66 | 56 | 10 |
| Yeast | 3 | 3 | |
| Yeast food | 0.5 | 0.5 | |
| Salt | 2.25 | 0.25 | 2 |
| Sugar (sucrose or dextrose) | 8 | 2 | 6 |
| Whey-soy concentrate | 4 | | 4 |
| Shortening | 3 | | 3 |
| Emulsifier | 0.5 | | 0.5 |
| Mold inhibitor | .125 | .125 | |
| Total | 187.375 | 109.875 | 75.5 |

In customary practice using the conventional sponge method, approximately 60% of the flour, water, and yeast are placed into the dough mixer at a temperature that may range from about 80° F. to about 85° F. The mass is agitated until fully developed, then placed into a trough and fermented until it recedes. After this it is returned to the mixer with the remainder of the ingredients and developed into the final dough. This dough is put into pans, baskets or sheet pans and then placed directly into the hearth of the oven and baked in accordance with conventional procedures.

In an alternative procedure a so-called "liquid" sponge is produced in what may be termed dairy agitating tanks by using from about 25% to as much as about 45% of the flour with about 65% to about 75% water, yeast, yeast food, etc. The mass is fermented for a period of two to two and one-half hours and then metered in required quantity directly into the dough mixer. The balance of the ingredients is then added and the mass agitated until the dough is fully developed. This dough is measured into pans, baskets or sheet pans, according to usual baking practice. The pans, etc., are directly placed onto the hearth of the oven and baked according to regular procedure.

In employing the novel soya-whey addition product, it may be added at a sponge stage or when the conventional system is used, it may be added to the sponge or dough stage. Since the novel addition product imbibes fully its own weight of water to produce a mass of the consistency of the dough, it increases the final dough weight by about twice its own weight, producing an added yield. It also introduces nutritive value fully equal to the nutritive value of non-fat dry milk.

The following Table II shows the score value of control bread containing 4% of non-fat dry milk and my new soya-whey bread containing 4% of the novel concentrate on a dry basis. These values were obtained from laboratory tests, but should approximate those obtained when such bread is made under commercial baking conditions.

TABLE II.—SCORE VALUE OF SOYA-WHEY FLOUR BREAD

|  | Ideal | Control | Soya-whey bread |
| --- | --- | --- | --- |
| Symmetry | 5 | 4.37 | 4.69 |
| Bloom | 5 | 4.37 | 4.69 |
| Color of crust | 5 | 4.37 | 4.69 |
| Volume | 5 | 4.07 | 4.69 |
| Consistency of crust | 5 | 4.07 | 4.37 |
| Color of crumb | 10 | 8.12 | 9.38 |
| Grain | 10 | 8.75 | 9.38 |
| Texture | 15 | 12.17 | 13.13 |
| Aroma | 10 | 8.75 | 8.75 |
| Flavor | 20 | 17.52 | 18.73 |
| Eating quality | 10 | 8.12 | 8.75 |
| Total score | 100 | 84.68 | 91.25 |

I developed my scoring system to show the score value of baked goods as a good indication of the merit of the product. A number of characteristics are taken into consideration and points are given to the various properties. The aim in each case is to bring out the value of the product from the standpoint of its properties and its acceptance by the consumer. In other words, a scoring system is used as a measuring stick, so to speak, in determining the value of a product through the points given in the system. My system of scoring takes ten different properties into consideration. It must be understood that each one of these characteristics is thoroughly understood by those skilled in the art of baking. In passing, it is to be noted that the scoring system was developed by the inventor and was used as a standard system for over 35 years in scoring bakery products published in articles in Bakers Weekly and presented in numerous chemical reports during the period he was associated as Technical Director of the publisher of Bakers Weekly.

While many theories are plausible, it is not certain and proven what exact mechanism is involved in the oxidation by calcium peroxide. It is believed that calcium peroxide might oxidize the sulfhydryl and/or disulfide compounds contained within the protein structure of these materials in which they are oxidized to cysteic acid in the presence of an organic acid. In this particular case, it is lactic acid due to the presence of the same in whey. In the oxidation of the sulfhydryl and disulfide groups contained within cystine they can be oxidized to the stage of sulfinic acid through the use of calcium peroxide, requiring ⅔ of the oxidation value when the cystine is oxidized to cystic acid according to the following equation:

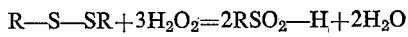

$$R-S-SR + 3H_2O_2 = 2RSO_2-H + 2H_2O$$

To clarify the term sulfinic acid in relation to cysteic acid, biochemical literature shows that cysteic acid and sulfonic are interchangeable, thus the term sulfinic acid when the lesser quantity of oxygen is contained within the molecule. Where there is an insufficient quantity of lactic acid in whey, lactic acid may be added as such according to the following equations:

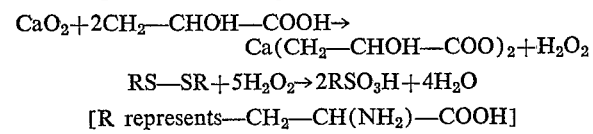

$$CaO_2 + 2CH_2-CHOH-COOH \rightarrow Ca(CH_2-CHOH-COO)_2 + H_2O_2$$

$$RS-SR + 5H_2O_2 \rightarrow 2RSO_3H + 4H_2O$$

[R represents—$CH_2-CH(NH_2)-COOH$]

Some bakers use dried brewers yeast and torula yeast to raise the protein level and to impart flavor to bread rolls, etc. Since these yeasts also contain the sulfhydryl and disulfide reducing compounds, they may also be treated with calcium peroxide and/or hydrogen peroxide. Likewise, whey alone or defatted soy flour alone or in combination may be oxidized with calcium peroxide.

It is to be noted that the present invention is not to be confused with the use of such oxidizing agents as bromate, chlorates, iodates, chlorine dioxide, benzoyl peroxide, acetone peroxide and azodicarbonamide.

Although the present invention has been described in conjunction with preferred embodiments, it is to be understood that modifications and variations may be resorted to without departing from the spirit and scope of the invention, as those skilled in the art will readily understand. For example, hydrogen peroxide may be used in conjunction with calcium peroxide in making my novel whey-soy addition agent. Such modifications and variations are considered to be within the purview and scope of the invention and appended claims.

I claim:

1. The method of treating defatted soy flour which comprises forming soy flour in a water suspension, treating said suspension with calcium peroxide, and heating said water suspension containing calcium peroxide at a near boiling temperature for a period of time less than one hour.

2. In the method of treating milk and milk derivatives in liquid form, the improvement which comprises treating such a liquid with calcium peroxide in the presence of an organic acid for a short period of time less than one hour at a near boiling temperature, and thereafter drying the resultant liquid to produce a white powder-like material.

3. The method of producing a novel baking addition agent which comprises making a slurry containing liquid whey, defatted soy flour and calcium peroxide, heating the slurry to about 180° F. for a short period of time less than one hour, condensing said heated slurry, and thereafter drying the condensed slurry to a powdered baking addition agent.

4. The method of producing a novel baking addition agent which comprises making a slurry containing about 1000 pounds of liquid whey, about 70 pounds of defatted soy flour and about 0.25 to about 1.5 pounds of calcium peroxide, heating the slurry to about 180° F. for a short period of time up to about 30 minutes, condensing said heated slurry down to a 25% to 30% solids content, and thereafter drying the condensed slurry to a powdered baking addition agent.

5. The method of producing a novel baking addition agent which comprises suspending whey, non-fat milk and defatted soy flour in liquid, treating said liquid with calcium peroxide in the presence of lactic acid, and heating said liquid containing calcium peroxide and lactic acid to near boiling temperature for a short period of less than one hour and drying the same.

6. The method of producing a novel baking addition agent which comprises suspending at least one agent of the group consisting of whey, non-fat milk and defatted soy flour in liquid, treating said liquid with calcium peroxide in the presence of lactic acid, and heating said liquid containing calcium peroxide and lactic acid to near boiling temperature for a short period of less than one hour and drying the same.

7. In a method of making yeast-leavened products, the improvement which comprises making a slurry containing liquid whey, defatted soy flour and calcium peroxide, heating the slurry to about 180° F. for a short period of time less than one hour, condensing said heated slurry, drying the condensed slurry to a powdered whey-soy baking addition agent, incorporating said whey-soy baking addition agent in yeast-leavened dough, and thereafter baking the same into bread and rolls.

8. In a method of making yeast-leavened products, the improvement which comprises making a slurry containing about 1000 pounds of liquid whey, about 70 pounds of defatted soy flour and about 0.25 to about 1.5 pounds of calcium peroxide, heating the slurry to about 180° F. for a short period of time up to about 30 minutes, condensing said heated slurry down to a 25% to 30% solids content, drying the condensed slurry to a powdered whey-soy baking addition agent, incorporating said whey-soy baking addition agent in yeast-leavened dough in the amount of about 2% to about 5% of the weight of flour, and thereafter baking the same into bread and rolls.

9. An improved method of making yeast-leavened products including baked breads and baked rolls which comprises suspending whey, non-fat milk and defatted soy flour in liquid, treating said liquid with calcium peroxide in the presence of lactic acid, heating said liquid containing calcium peroxide and lactic acid to near boiling temperature for a short period of less than one hour, drying the same to a powdered material constituting a baking addition agent, incorporating in a yeast-leavened dough said baking addition agent constituted of a powdered material, depositing portions of said dough into baking pans, and subjecting said dough in pans to baking to produce baked products including breads and rolls.

10. An improved method of making yeast-leavened products including baked breads and baked rolls which comprises suspending at least one agent of the group consisting of whey, non-fat milk and defatted soy flour in liquid, treating said liquid with calcium peroxide in the presence of lactic acid, and heating said liquid containing calcium peroxide and lactic acid to near boiling temperature for a short period of less than one hour, drying the same to a powdered material constituting a baking addition agent, incorporating in a yeast-leavened dough said baking addition agent constituted of a powdered material to an extent of about 2% to about 5% of the weight of flour in said dough, depositing portions of said dough into baking pans, and subjecting said dough in pans to baking to produce baked products including breads and rolls.

References Cited

UNITED STATES PATENTS

| | | | |
|---|---|---|---|
| 2,553,578 | 5/1951 | Hansen | 99—56 |
| 2,555,514 | 6/1951 | Sharp et al. | 99—91 X |
| 2,654,672 | 10/1953 | Selman et al. | 99—91 X |
| 2,663,643 | 12/1953 | Hansen | 99—91 X |
| 2,736,654 | 2/1956 | Selman et al. | 99—90 X |
| 3,006,765 | 10/1961 | Ferrari | 99—91 X |
| 3,219,455 | 11/1965 | Dubois | 99—91 X |
| 3,429,712 | 2/1969 | Tutner | 99—90 |

OTHER REFERENCES

Jenness et al., Principles of Dairy Chemistry, John Wiley & Sons, New York, 1959 (pp. 338–339).

Whittier et al., By Products From Milks, Reinhold Publ. Corp., New York, 1950 (pp. 161–162).

LIONEL M. SHAPIRO, Primary Examiner

D. M. NAFF, Assistant Examiner

U.S. Cl. X.R.

99—54, 56, 91, 99